United States Patent
Kwon et al.

(10) Patent No.: US 11,209,896 B2
(45) Date of Patent: Dec. 28, 2021

(54) SEMICONDUCTOR DEVICE AND METHOD FOR OPERATING SEMICONDUCTOR DEVICE

(71) Applicant: Samsung Electronics Co., Ltd., Suwon-si (KR)

(72) Inventors: Min Kyu Kwon, Hwaseong-si (KR); Hyoung Seok Oh, Seoul (KR); Hyun Su Kim, Suwon-si (KR); Tae Jin Jeong, Incheon (KR); Dae Woong Cho, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 252 days.

(21) Appl. No.: 16/381,240

(22) Filed: Apr. 11, 2019

(65) Prior Publication Data
US 2020/0073471 A1 Mar. 5, 2020

(30) Foreign Application Priority Data
Aug. 31, 2018 (KR) .......................... 10-2018-0103236

(51) Int. Cl.
*G06F 1/32* (2019.01)
*G06F 1/3296* (2019.01)
*G06F 1/3212* (2019.01)

(52) U.S. Cl.
CPC .......... *G06F 1/3296* (2013.01); *G06F 1/3212* (2013.01)

(58) Field of Classification Search
CPC .... G06F 1/3296; G06F 1/3212; G06F 1/3234; G06F 1/3206; G06F 1/263; Y02D 30/50; H02J 7/0019; B60L 58/22; H01M 2010/4271

USPC .... 713/340, 300, 310, 320, 330; 702/60, 61, 702/62, 63, 64, 65, 66, 67, 68
See application file for complete search history.

(56) References Cited

U.S. PATENT DOCUMENTS

| 6,947,035 B1 * | 9/2005 | Shiraga ................. G06F 1/1616 345/211 |
| 8,130,000 B2 | 3/2012 | Botker et al. |
| 8,426,047 B2 * | 4/2013 | Emori ................... H02J 7/0019 429/61 |
| 2003/0044689 A1 * | 3/2003 | Miyazaki ............... B60L 50/64 429/320 |

(Continued)

FOREIGN PATENT DOCUMENTS

| CN | 106877450 B | * | 6/2019 | ............... H02J 7/35 |
| KR | 10-1418129 | | 12/2008 | |

(Continued)

*Primary Examiner* — Danny Chan
(74) *Attorney, Agent, or Firm* — Harness, Dickey & Pierce, P.L.C.

(57) ABSTRACT

Provided are a semiconductor device and a method for operating the semiconductor device. A semiconductor device includes a low power condition module which determines whether a system operated by a battery satisfies enter and exit conditions of a low power mode; an address module which identifies a predetermined own address; a low power set module which sets a detailed operation mode of the low power mode in accordance with the address identified by the address module; a debounce module which executes a debounce operation before the system entering the low power mode; and a low power enter/exit module which executes entry and exit of the low power mode of the system.

14 Claims, 14 Drawing Sheets

(56) References Cited

U.S. PATENT DOCUMENTS

| | | | |
|---|---|---|---|
| 2006/0284857 A1* | 12/2006 | Oh .................... | G06F 1/3203 345/173 |
| 2010/0134305 A1 | 6/2010 | Lu et al. | |
| 2011/0022859 A1* | 1/2011 | More .................. | G06F 1/3203 713/300 |
| 2012/0299377 A1* | 11/2012 | Masuda ............... | B60L 50/40 307/10.1 |
| 2018/0090942 A1 | 3/2018 | Nunez et al. | |

FOREIGN PATENT DOCUMENTS

| KR | 1835585 | 2/2014 |
|---|---|---|
| KR | 10-2014-0124470 | 10/2014 |
| KR | 10-2017-0060406 | 6/2017 |
| KR | 10-2018-0013495 | 2/2018 |

\* cited by examiner

SEMICONDUCTOR DEVICE AND METHOD FOR OPERATING SEMICONDUCTOR DEVICE

CROSS-REFERENCE TO RELATED APPLICATION

This application claims the benefit of Korean Patent Application No. 10-2018-0103236, filed on Aug. 31, 2018, in the Korean Intellectual Property Office, the disclosure of which is incorporated herein in its entirety by reference.

BACKGROUND

1. Field of the Disclosure

The present disclosure relates to a semiconductor device and/or a method for operating the semiconductor device.

2. Description of the Related Art

As performance of a mobile system is improved and functions to be provided to users are further diversified, a stable supply of power to the mobile system having a sufficient capacity becomes an important issue. In order to secure a sufficient capacity of power supply, multiple batteries may be adopted as the power supply of the mobile system.

However, there may be a difference in standard between the multiple batteries installed in a single mobile system, and due to a difference in energy between the multiple batteries, cell balancing occurs when the multiple batteries are electrically connected. If the cell balancing occurs, a balancing current flows from one battery to another battery. When the balancing current suddenly occurs in an excessive amount, there is a risk of a damage of at least a part of the multiple batteries.

SUMMARY

Example embodiments of the present disclosure provide a semiconductor device and/or a method for operating the semiconductor device capable of providing entry and exit of a safe low power mode for a system operating with multiple batteries.

Example embodiments of the present disclosure also provide a semiconductor device and/or a method for operating the semiconductor device capable of preventing damage to multiple batteries due to excessive balancing current to control the balancing current generated between the multiple batteries to supply a stable power supply to the mobile system using the multiple batteries.

However, example embodiments of the present disclosure are not restricted to the one set forth herein. The above and other example embodiments of the present disclosure will become more apparent to one of ordinary skill in the art to which the present disclosure pertains by referencing the detailed description of the present disclosure given below.

According to an example embodiment of the present disclosure, there is provided a semiconductor device including processing circuitry configured to determine whether a system operated by a battery satisfies conditions associated with switching operating modes of the semiconductor device, the operating modes including a plurality of low power modes, identify an address associated with the semiconductor device, determine a selected low power operating mode from among the plurality of low power modes in accordance with the address, execute a debounce operation to stabilize an output of the battery, and switch to the selected low power operating mode after the processing circuitry executes the debounce operation.

According to another example embodiment of the present disclosure, there is provided a semiconductor device including processing circuitry configured to, determine whether a system operated by a battery satisfies conditions associated with switching operating modes of the semiconductor device, the operating modes including a plurality of low power modes, identify an address associated with the semiconductor device, determine a selected low power operating mode from among the plurality of low power modes in accordance with the address, execute a delay operation, and switch to the selected low power operating mode after the processing circuitry executes the delay operation.

According to still another example embodiment of the present disclosure, there is provided a semiconductor device including a first current control IC; and a second current control IC, the second current control IC being in parallel with the first current control IC between a battery and a system, the second current control IC configured to operate in various operating modes including a plurality of low power modes, the plurality of low power modes including a first mode and a second mode, the second current control IC configured to, execute a debounce operation before switching to the first mode to stabilize an output of the battery, the first mode being a mode in which the second current control IC maintains an electrical connection between the system and the battery, and switch to the second mode without executing the debounce operation, the second mode being a mode in which the second current control IC cuts off the electrical connection between the system and the battery.

BRIEF DESCRIPTION OF THE DRAWINGS

The above and other example embodiment and features of the present disclosure will become more apparent by describing in detail example embodiments thereof with reference to the attached drawings, in which.

DETAILED DESCRIPTION

Figure 1:
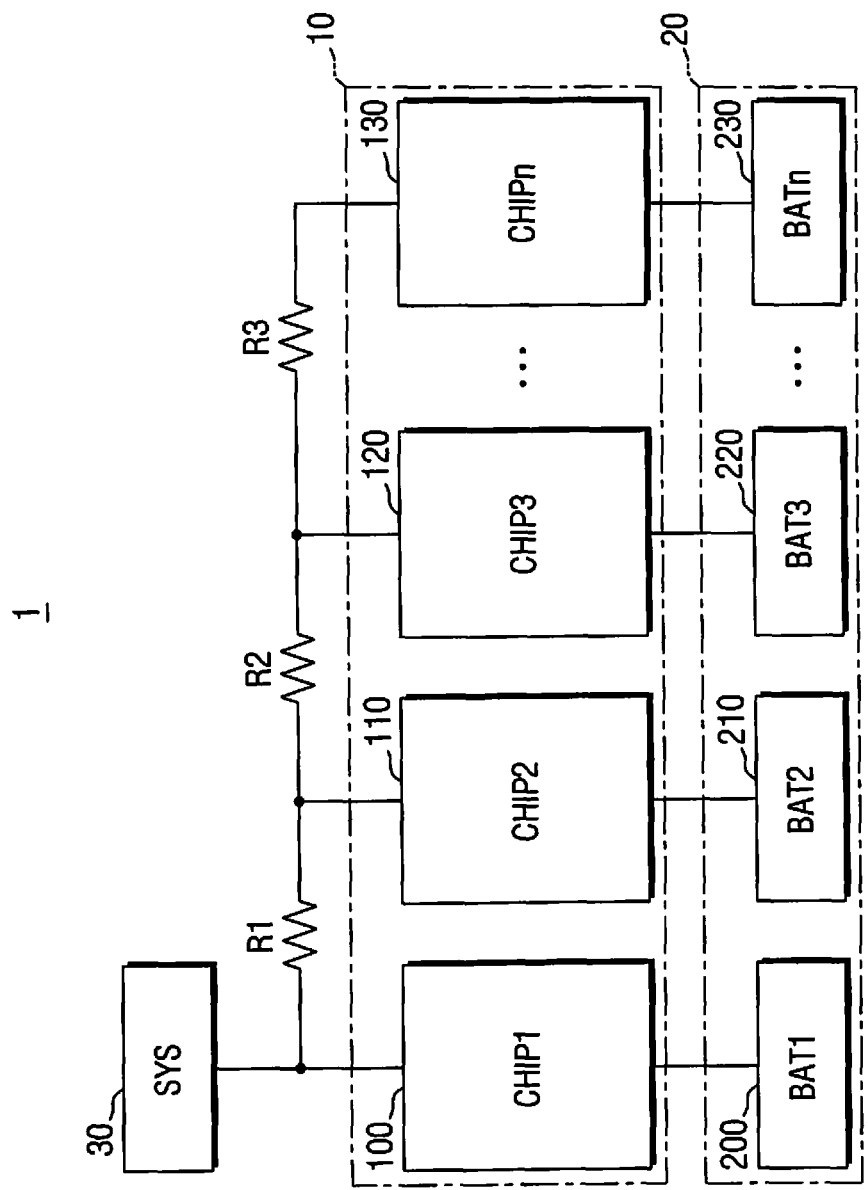
FIG. 1 is a schematic diagram for explaining a semiconductor system according to an example embodiment of the present disclosure.

FIG. 1 is a schematic diagram for explaining a semiconductor system according to an example embodiment of the present disclosure.

Referring to FIG. 1, a semiconductor system 1 according to an example embodiment of the present disclosure includes a current control IC (Integrated Circuit) 10, a battery 20 and a system 30.

The battery 20 may include a plurality of batteries 200, 210, 220, and 230 as multiple batteries. That is, in the present specification, the semiconductor system 30 is assumed to operate in the multiple battery environments. The plurality of batteries 200, 210, 220 and 230 may be connected in parallel with each other to supply a high capacity of power supply to the system 30.

The plurality of batteries 200, 210, 220 and 230 may have the same standard as each other, but some parts of the plurality of batteries 200, 210, 220 and 230 may have standards different from other parts thereof. Even if the plurality of batteries 200, 210, 220 and 230 has the same standard, they may have electrical characteristics different from each other. Due to such differences in the standards and the electric characteristics, a difference in energy may occur between the plurality of batteries 200, 210, 220 and 230, and a current caused by the energy difference may flow between the plurality of batteries 200, 210, 220 and 230 and the system 30, or between the plurality of batteries 200, 210, 220 and 230.

For example, when the batteries 200, 210 having different standards and electrical characteristics are electrically connected to the system 30, if the energy of the battery 200 is higher than the energy of the battery 210, cell balancing may occur, in which a current may flow from the battery 200 to the battery 210 due to the difference. In this way, when the cell balancing occurs and a balancing current flowing from the battery 200 to the battery 210 is suddenly generated in an excessive amount, the battery 210 may be damaged.

The current control IC 10 is a semiconductor device arranged between the battery 20 and the system 30 to control the current flowing between the battery 20 and the system 30. Specifically, the current control IC 10 may include a plurality of current control ICs 100, 110, 120 and 130 corresponding to each of the plurality of batteries 200, 210, 220 and 230 forming the multiple batteries. In a single battery environment, since the cell balancing does not occur, it may be unnecessary to implement the current control IC 10 between the battery 20 and the system 30. However, in the multiple battery environment, the plurality of current control ICs 100, 110, 120 and 130 may perform the control to reduce (or, alternatively, prevent) occurrence of the excessive balancing current, thereby reducing (or, alternatively, preventing) the damage to the battery 210.

For example, when the balancing current flowing from the battery 200 to the battery 210 suddenly occurs in an excessive amount, the current control IC 110 disposed between the battery 210 and the battery 200 may operate the current control function to prevent damage to the battery 210.

In example embodiments, such a current control IC 10 or a plurality of current control ICs 100, 110, 120 and 130 will also be referred to as a "semiconductor device".

The system 30 is a computing system that receives the power supply from the battery 20 to operate. For example, the system 30 may be a mobile system operated by the battery 20, for example, a smartphone, a tablet computer, a laptop computer or the like. However, the environment in which the semiconductor device of the present disclosure operates is not limited to the mobile system environment, but may include any computing system environment using the battery 20. As described above, the system 30 operates in the multiple battery environments and may receive the power supply from the plurality of batteries 200, 210, 220 and 230.

On the other hand, a power supply device, for example, a power supply adapter may be connected to the system 30. When the power supply adapter is not connected to the system 30, since the system 30 is supplied with power by the battery 20, the battery 20 is discharged, and the current flows from the battery 20 toward the system 30 at this time. Alternatively, when the power supply adapter is connected to the system 30, the system 30 is supplied with the power by the power supply device, the battery 20 is charged, and the current flows from the system 30 toward the battery 20 at this time.

Figure 2A:
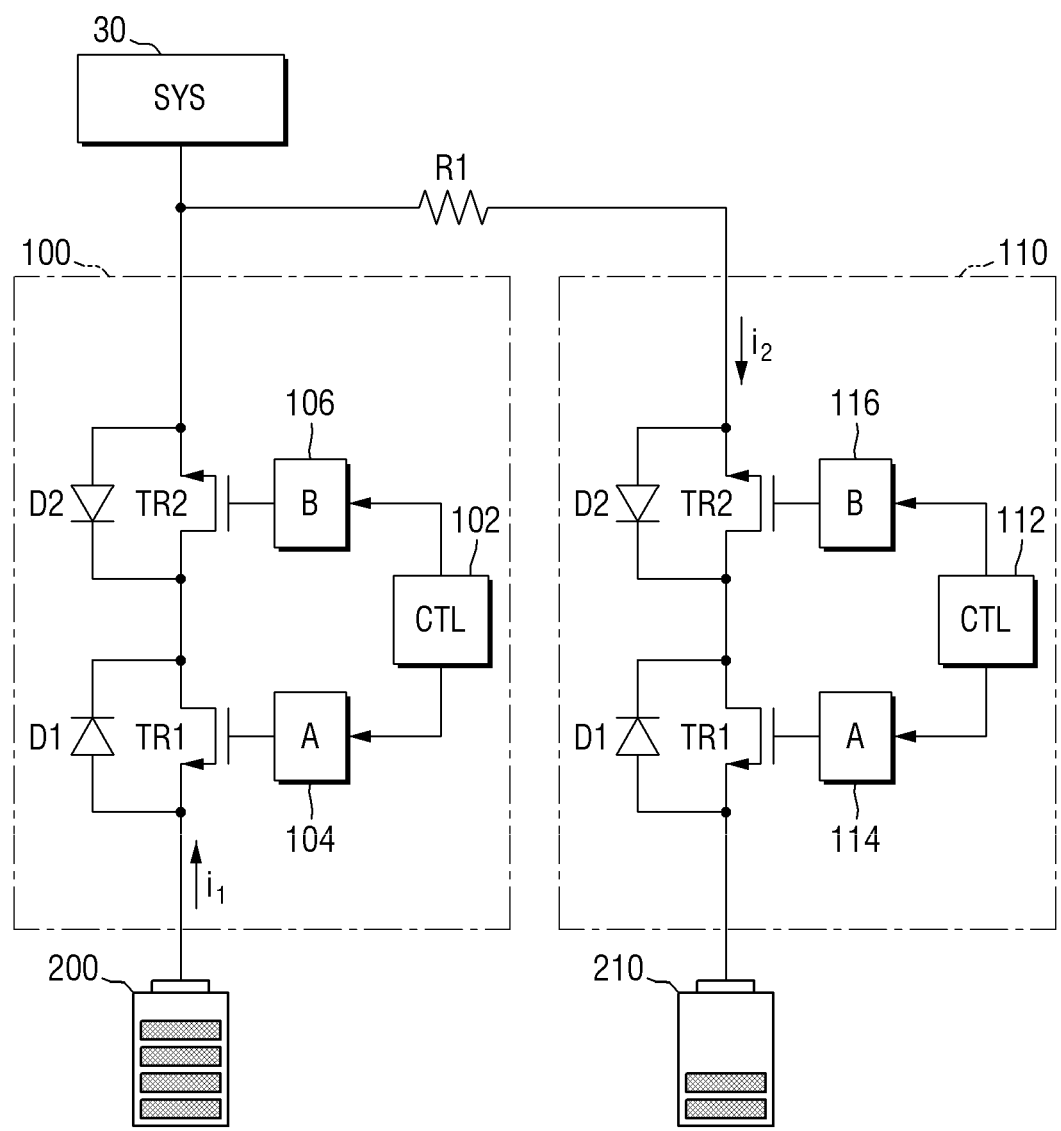
FIG. 2A is a block diagram for explaining the semiconductor device according to an example embodiment of the present disclosure.
Figure 2B:
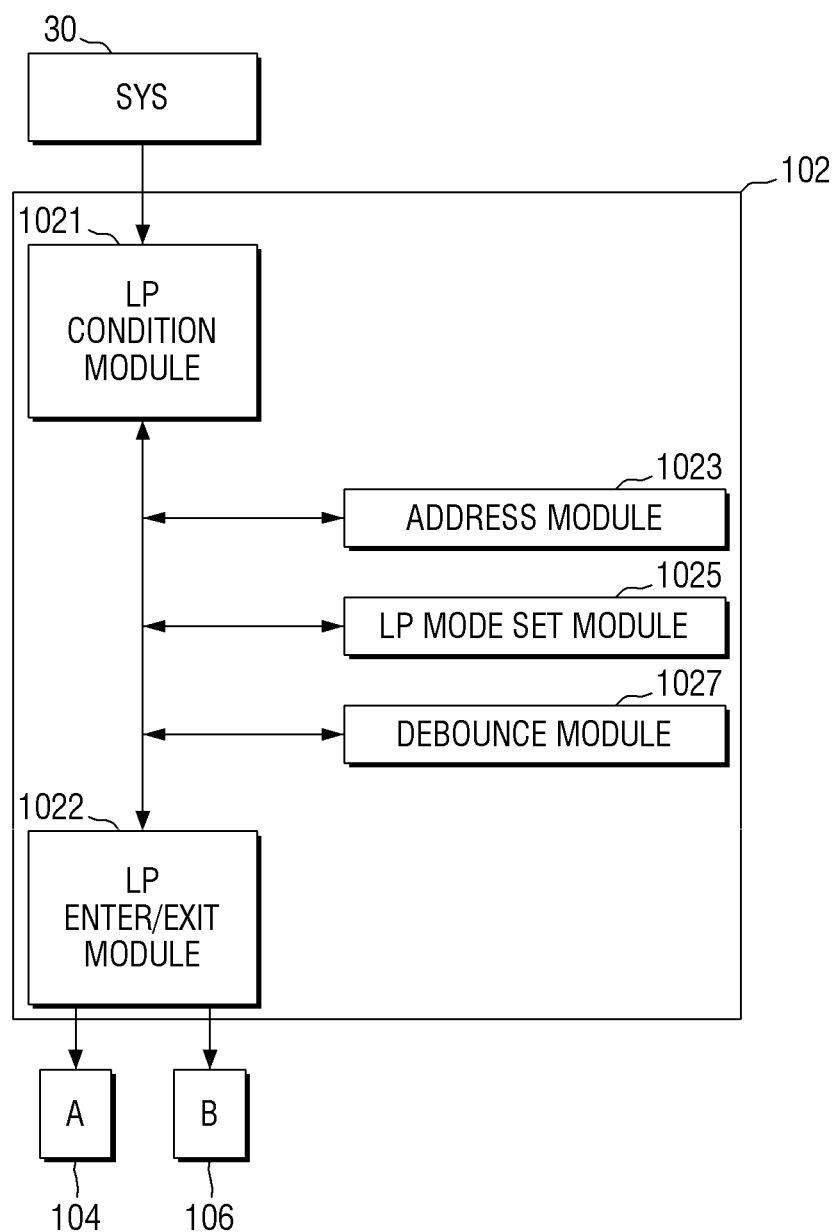
FIG. 2B is a block diagram for explaining a controller of the semiconductor device according to an example embodiment of the present disclosure.

Referring now to FIGS. 2A and 2B, a semiconductor device (that is, a current control IC) according to an example embodiment of the present disclosure will be described in more detail.

FIG. 2A is a block diagram for explaining the semiconductor devices 100, 110 according to an embodiment of the present disclosure.

Referring to FIG. 2A, the semiconductor system 2 includes a plurality of semiconductor devices 100, 110. The semiconductor devices 100, 110 are disposed between the batteries 200, 210 and the system 30 to provide a current control function. To this end, the semiconductor device 100 may include transistors TR1, TR2, a controller 102, a first gate controller 104 and a second gate controller 106. Further, the semiconductor device 110 may include transistors TR1, TR2, a controller 112, a first gate controller 114, and a second gate controller 116.

The diodes D1, D2 illustrated in this drawing indicate body diodes of the transistors TR1, TR2, respectively. In an example embodiment, the transistors TR1, TR2 may be implemented as an n-channel MOSFET, but the scope of the present disclosure is not limited thereto.

Each of the first gate controllers 104, 114 may provide a signal for turning on or turning off the transistor TR1 to the gate of the transistor TR1, under the control of the controllers 102, 112. Further, each of the second gate controller 106, 116 may provide a signal for turning on or turning off the transistor TR2 to the gate of the transistor TR2, under the control of the controllers 102, 112.

In order to perform the current control function by the semiconductor devices 100, 110 and reduce (or, alternatively, prevent) damage to the multiple batteries due to the excessive balancing current, the controllers 102, 112 may control the first gate controllers 104, 114 and the second gate controller 106, 116. For example, when the energy of the battery 200 is higher than the energy of the battery 210, due to the difference, at least some of a current $i_1$ provided from the battery 200 flows as a balancing current $i_2$ toward the battery 210. At this time, the controller 112 controls the first gate controller 114 and the second gate controller 116 so that the semiconductor device 110 may execute the current control function.

On the other hand, the controllers 102, 112 may control the first gate controllers 104, 114 and the second gate controllers 106, 116 at the time of charging and discharging the batteries 200, 210. For example, when the battery 200 is charged, the controller 102 controls the transistor TR1, and if the charging current becomes a current larger than an allowable value, the controller 102 lowers the gate voltage of the transistor TR1, using the first gate controller 104. As a result, the on-resistance of the transistor TR1 increases, and the current may be controlled. Even when the battery 200 is discharged, the controller 102 may similarly control the current in the manner of controlling the second gate controller 104 to adjust the gate voltage of the transistor TR2.

In addition, the controllers 102, 112 may control the first gate controllers 104, 114 and the second gate controllers 106, 116 to provide entry and exit of stable low power mode of the system 30.

FIG. 2B is a block diagram for explaining a controller of the semiconductor device according to an example embodiment of the present disclosure.

Referring to FIG. 2B, the controller 102 of the semiconductor device 100 according to the embodiment of the present disclosure may include a low power condition module 1021, a low power enter/exit module 1022, an address module 1023, a low power (LP) mode set module 1025 and a debounce module 1027. In this example embodiment, the controller 102 will be described, but the description may also be similarly applied to the controller 112 described in this specification.

In some example embodiments, elements of the controller 102, 112 may be implemented using hardware or a combination of hardware and software.

Hardware may be implemented using processing circuitry such as, but not limited to, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

The low power condition module 1021 determines whether the system 30 operated by the battery 20 satisfies the enter and exit conditions of the low power mode (or, alternatively, satisfies conditions associated with switching an operating mode).

For example, when the power supply of the system 30 is turned off, the low power condition module 1021 may determine that the enter condition of the low power mode is satisfied. As another example, when receiving an enter command of the low power mode from the user, the low power condition module 1021 may determine that the enter condition of the low power mode is satisfied. However, the scope of the present disclosure is not limited thereto, and the enter condition of the low power mode may vary depending on the specific implementation purpose.

On the other hand, for example, the low power condition module 1021 may determine that the exit condition of the low power mode is satisfied when the power supply of the system 30 is turned on. As another example, when receiving an exit command of the low power mode from the user, the low power condition module 1021 may determine that the exit condition of the low power mode is satisfied. However, the scope of the present disclosure is not limited thereto, and the exit condition of the low power mode may vary depending on the specific implementation purpose.

The low power enter/exit module 1022 performs entry and exit of the low power mode of the system 30.

When it is determined that the enter and exit conditions of the low power mode are satisfied in the low power condition module 1021, the low power enter/exit module 1022 executes the entry and exit of the low power mode amongst a plurality of operating modes, using the first gate controller 104 and the second gate controller 106.

In various example embodiments of the present disclosure, the low power mode may include two detailed operation modes including a first mode and a second mode. The first mode refers to a low power mode that maintains the electrical connection between the system 30 and the battery 20, and the second mode refers to a low power mode that cuts off the electrical connection between the system 30 and the battery 20.

The low power enter/exit module 1022 controls the first gate controller 104 and the second gate controller 106 depending on the detailed operation mode, and may control whether to maintain or cut off the electrical connection between the system 30 and the battery 20 when entering the low power mode. For example, in some example embodiments, the low power enter/exit module 1022 may switch to the selected low power mode after execution of the debounce operation. The detailed operation mode may be determined in a low power mode set module 1025 to be described later.

The address module 1023 identifies an own address determined in advance.

Referring to FIG. 2A together, the semiconductor device 100 may identify that its own address is a first address #1, using the address module 1023 inside the controller 102. Further, the semiconductor device 110 may identify that the own address is a second address #2, using the address module inside the controller 112. That is, each of the semiconductor devices 100, 110 may determine which of the plurality of current control ICs the respective semiconductor devices 100, 110 is, using the address module inside the controllers 102, 112.

In an example embodiment of the present disclosure, the address module 1023 may identify its own address in accordance with the value of the voltage level or the current level applied to, for example, an address ball of the semiconductor device 100. For example, when the voltage level applied to the address ball is the first level, the address module 1023 may determine that the address of the semiconductor device 100 is the first address #1. Alternatively, when the level of the voltage applied to the address ball is the second level, the address module 1023 may determine that the address of the semiconductor device 100 is the second address #2. However, the scope of the present disclosure is not limited to such an implementation example, and there may be various manners in which the address module 1023 is implemented.

The low power mode set module 1025 sets the detailed operation mode of the low power mode in accordance with the address identified by the address module 1023.

Specifically, when the address of the semiconductor device 100 identified by the address module 1023 is the first address #1, the low power mode set module 1025 may set the detailed operation mode of the low power mode to the first mode. Alternatively, when the address of the semiconductor device 100 identified by the address module 1023 is the second address #2 to #n, the low power mode set module 1025 may set the detailed operation mode of the low power mode to the first mode or to the second mode.

In some embodiments of the present disclosure, when the address identified by the address module 1023 is the second address #2 to #n, the detailed operation mode of the low power mode may be predetermined to the first mode or the second mode before the operation of the semiconductor device 100. For example, when the address of the semiconductor device 100 corresponds to the second address #2, the semiconductor device 100 may be determined in advance so that the detailed operation mode of the low power mode becomes the first mode, and when the address of the semiconductor device 110 corresponds to the second address #2, the semiconductor device 100 may be determined in advance so that the detailed operation mode of the low power mode becomes the second mode.

The debounce module 1027 may perform a debounce operation before entering the low power mode to, for example, stabilize an output of the battery 20.

Specifically, when the detailed operation mode of the low power mode is determined to the first mode and the semiconductor device 100 executes the current control function, that is, the balancing current is detected inside the semiconductor device 100, the debounce module 1027 executes the debounce operation for a desired (or, alternatively, a predetermined) time.

Further, when the debounce module 1207 executes the debounce operation, the low power enter/exit module 1022 enters the low power mode after the debounce operation ends. For example, when the address of the semiconductor device 100 is the second address #2 and the detailed operation mode of the low power mode is set to the first mode, if the controller 102 performs the current control of the charging current, the debounce module 1027 performs a debounce operation that waits, for example, for 100 ms. Further, after the elapse of at least 100 ms, the low power enter/exit module 1022 enters the low power mode after the debounce operation ends.

Alternatively, when the detailed operation mode of the low power mode is determined to the second mode, the debounce module 1027 does not execute the debounce operation.

The operation of the semiconductor device according to one example embodiment of the present disclosure will now be described with reference to FIGS. 3 through 8.

Figure 3:
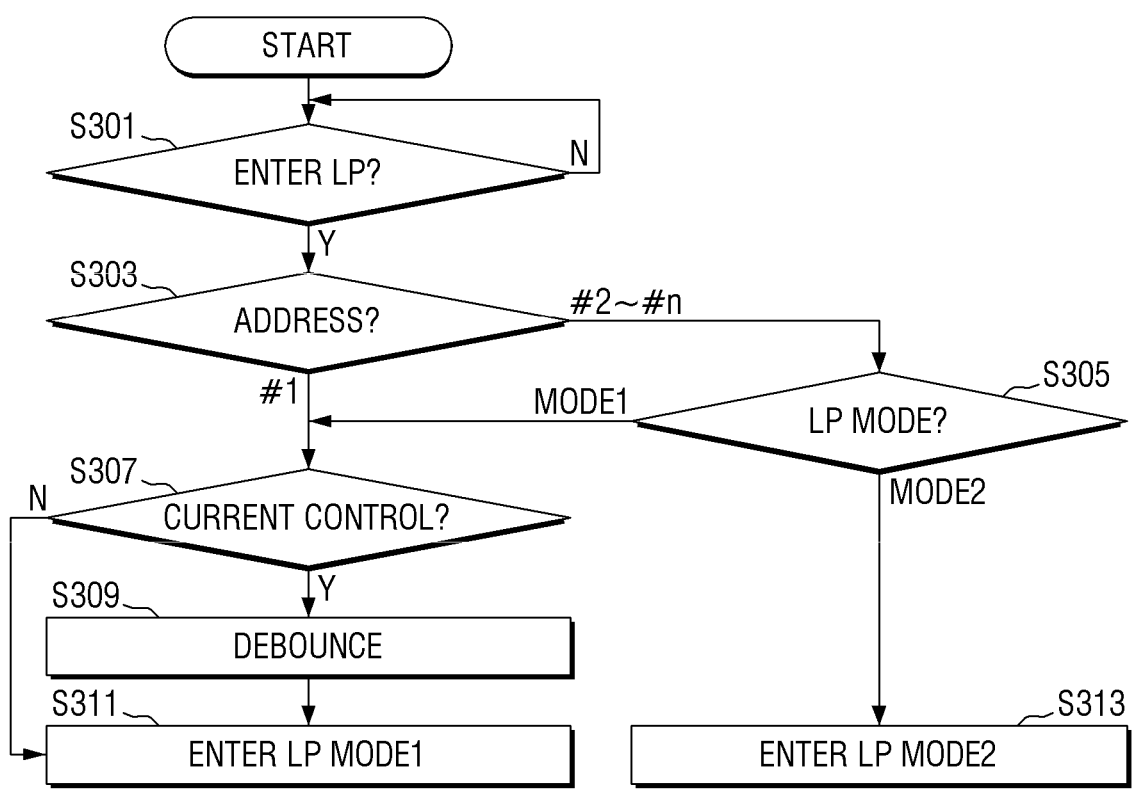
FIG. 3 is a flowchart for explaining a method for operating the semiconductor device according to an example embodiment of the present disclosure.

FIG. 3 is a flowchart for explaining a method for operating a semiconductor device according to an example embodiment of the present disclosure.

Referring to FIG. 3, in operation S301, the controller 102, 112 may determine whether the system 30 operated by the battery 20 satisfies the enter condition of the low power mode.

When the enter condition of the low power mode is satisfied (Y in S301), in operation S303, the controller 102, 112 may identify its own address of the semiconductor device 100 determined in advance, and, in operation S305, may set the detailed operation modes of the lower power mode in accordance with the identified address.

Specifically, when the identified address is the first address #1, the detailed operation mode of the low power mode is set to the first mode that maintains the electrical connection between the system 30 and the battery 20, and when the identified address is the second address #2 to #n, the detailed operation mode of the low power mode is set to the first mode, or is set to a second mode that cuts off the electrical connection between the system 30 and the battery 20.

When the detailed operation mode is set to the first mode, in operation S307, the controller 102, 112 may identify whether the current control is in operation. That is, the controller 102, 112 may identify whether the balancing current is detected inside the semiconductor device.

If the current control is in operation, in operation S309, the controller 102, 112 may execute a debounce operation for a desired (or, alternatively, a predetermined) time. Thereafter, after the debounce operation ends, in operation S311, the controller 102, 112 may enter the low power mode. Alternatively, if the current control is not operated, in operation S311, the controller 102, 112 may not immediately enter the low power mode is immediately executed without executing the debounce operation.

When the detailed operation mode is set to the second mode, the debounce operation is not executed. Instead, in operation S313, the controller 102, 112 may immediately enter the low power mode.

Figure 4:
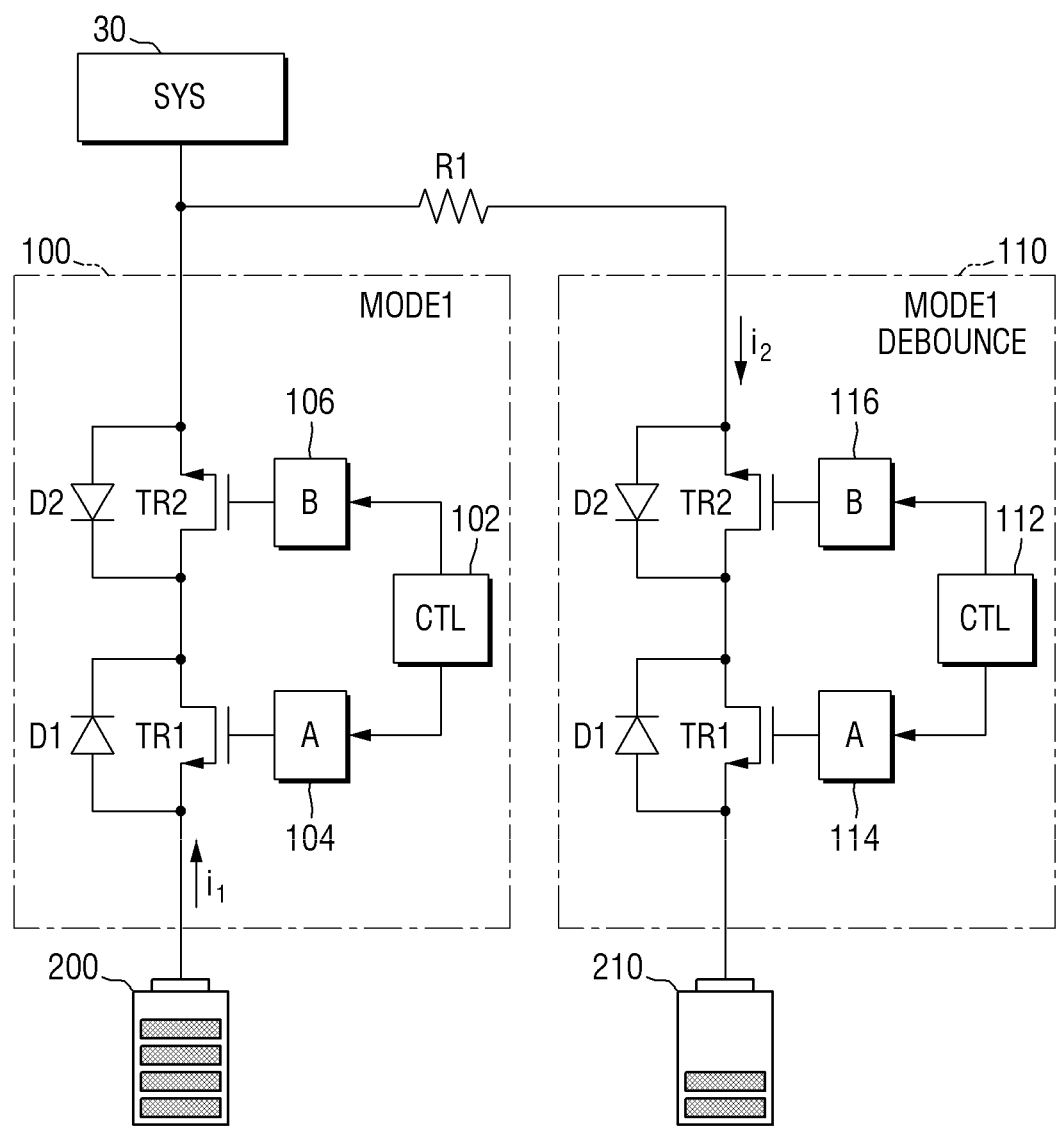
FIG. 4 is a block diagram for explaining the operation example of the semiconductor device according to the example embodiment of the present disclosure.

FIG. 4 is a block diagram for explaining an operation example of the semiconductor device according to the example embodiment of the present disclosure.

Referring to FIG. 4, in the semiconductor system 2 according to an example embodiment of the present disclosure, it is assumed that the semiconductor device 100 has a first address #1, the semiconductor device 110 has a second address #2, and the low power enter condition is also satisfied.

Since the identified address is the first address #1, the semiconductor device 100 sets the detailed operation mode of the low power mode to the first mode that maintains the electrical connection between the system 30 and the battery 20.

It is assumed that the identified address of the semiconductor device 110 is the second address #2, and the detailed operation mode of the low power mode is set to the first mode by the low power mode set module 1025 in the semiconductor device 110.

If the battery 200 and the battery 210 are electrically connected to each other, the balancing current $i_2$ is generated due to the energy difference between the battery 200 and the battery 210. Therefore, the semiconductor device 110 may execute a current control.

In this case, the semiconductor device 100 enters the low power mode without the debounce operation, but since the semiconductor device 110 executes the current control, the semiconductor device 110 executes the debounce operation for a desired (or, alternatively, a predetermined) time. Further, the semiconductor device 110 enters the low power mode after the debounce operation ends.

Figure 5:
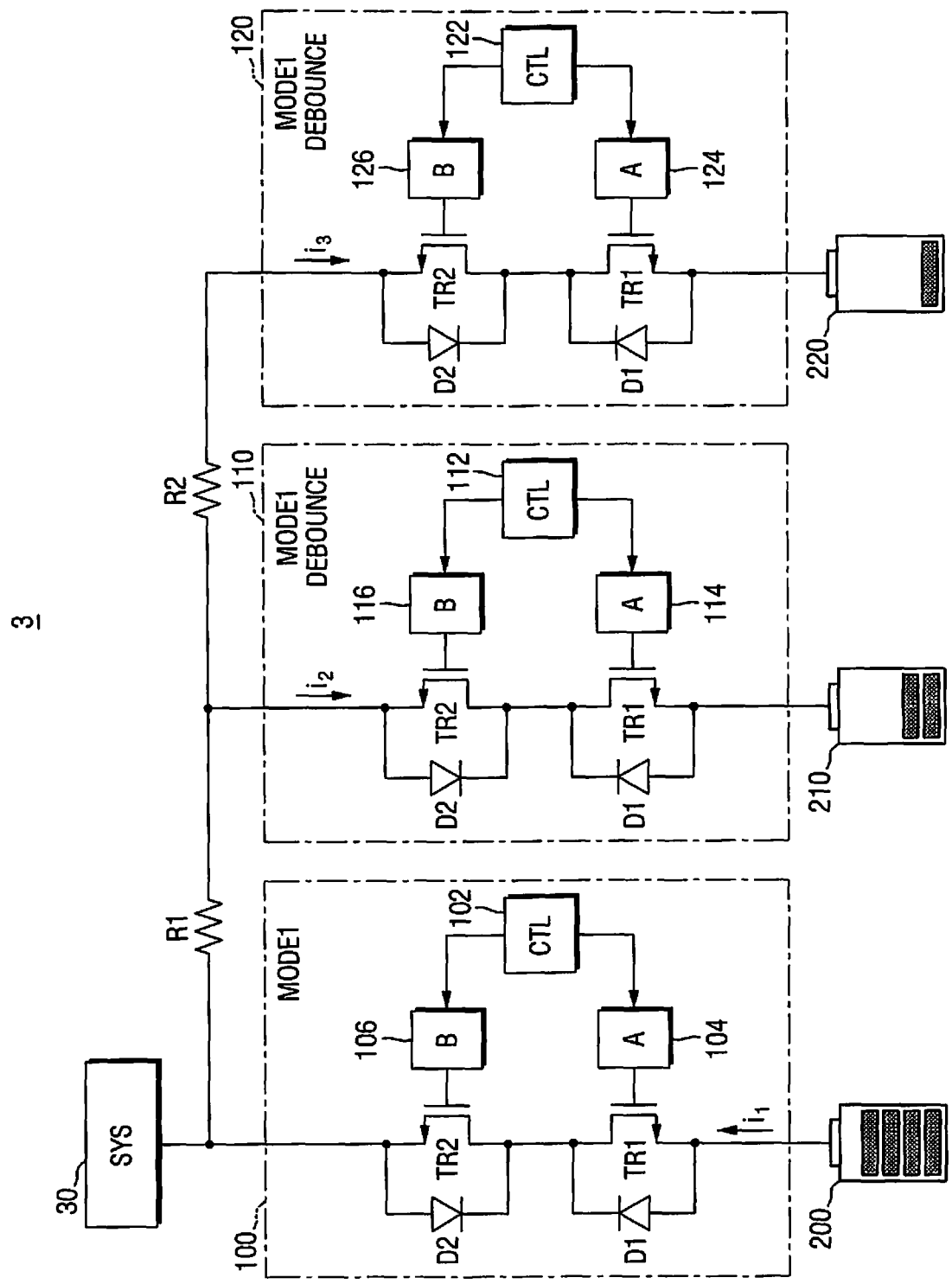
FIG. 5 is a block diagram for explaining the operation example of the semiconductor device according to the example embodiment of the present disclosure.

FIG. 5 is a block diagram for explaining an operation example of the semiconductor device according to the example embodiment of the present disclosure.

Referring to FIG. 5, in the semiconductor system 3 according to an embodiment of the present disclosure, it is assumed that the semiconductor device 100 has the first address #1, the semiconductor device 110 has the second address #2, the semiconductor device 120 has the third address #3, and the low power enter condition is also satisfied.

Since the identified address is the first address #1, the semiconductor device 100 sets the detailed operation mode of the low power mode to the first mode that maintains the electrical connection between the system 30 and the battery 20.

In the semiconductor devices 110, 120, it is assumed that the identified addresses are the second address #2 and the third address #3, respectively, and the detailed operation mode of the lower power mode is set to the first mode by the low power mode set module 1025.

If the battery 200 and the batteries 210, 220 are electrically connected to each other, the balancing current $i_2$ and the balancing current $i_3$ are generated due to the energy difference between the battery 200 and the batteries 210, 220. Therefore, the semiconductor devices 110, 120 may perform a current control.

In this case, the semiconductor device 100 enters the low power mode without the debounce operation, but since the semiconductor devices 110, 120 execute the current control, the semiconductor device 100 executes the debounce operation for a desired (or, alternatively, a predetermined) time. Further, the semiconductor devices 110, 120 enter the low power mode, after the debounce operation ends.

Figure 6:
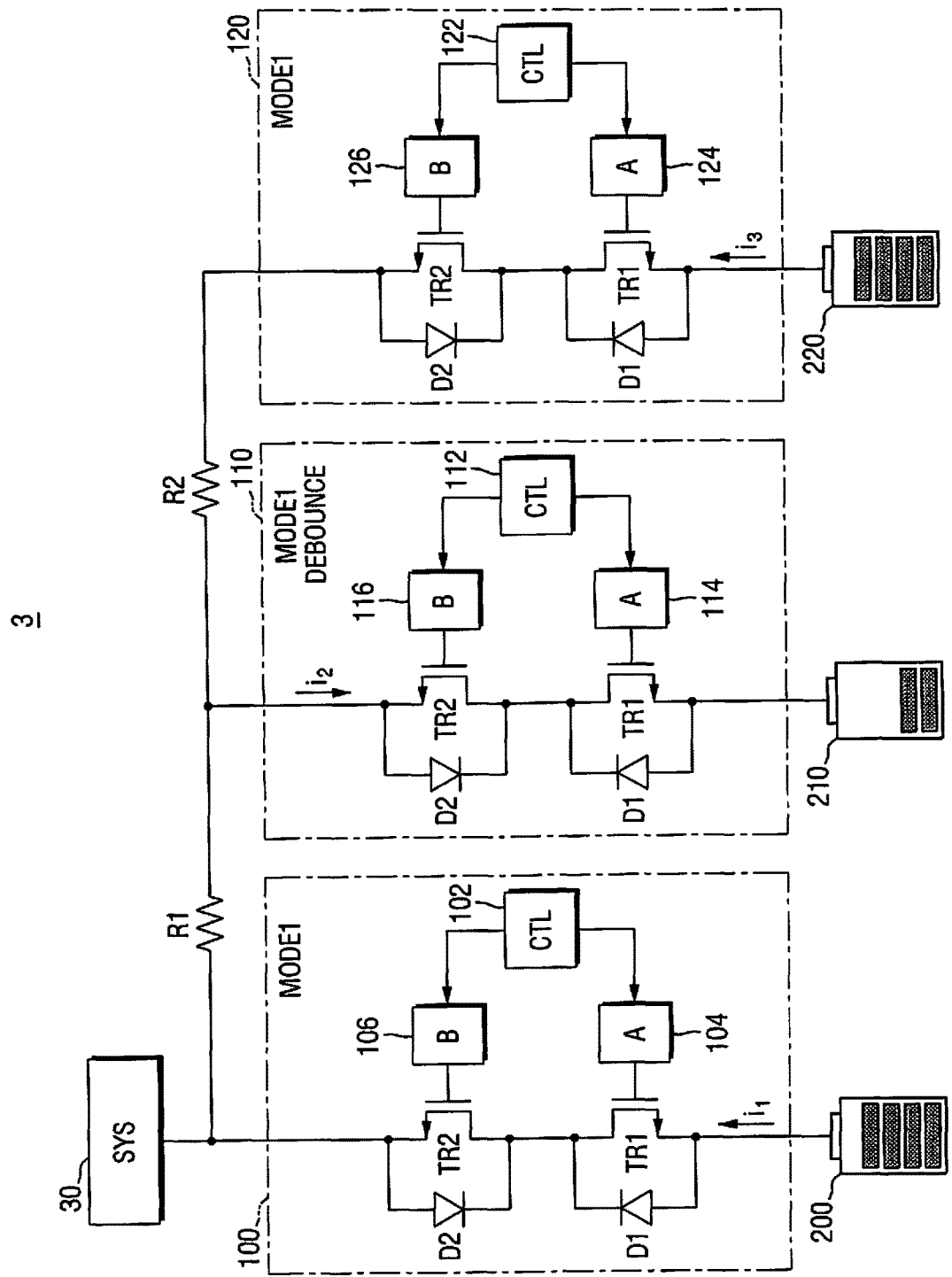
FIG. 6 is a block diagram for explaining the operation example of the semiconductor device according to the example embodiment of the present disclosure.

FIG. 6 is a block diagram for explaining an operation example of the semiconductor device according to the example embodiment of the present disclosure.

Referring to FIG. 6, in the semiconductor system 3 according to an embodiment of the present disclosure, it is assumed that the semiconductor device 100 has the first address #1, the semiconductor device 110 has the second address #2, the semiconductor device 120 has the third address #3, and the low power enter condition is also satisfied.

Since the identified address is the first address #1, the semiconductor device 100 sets the detailed operation mode of the low power mode to the first mode that maintains the electrical connection between the system 30 and the battery 20.

In the semiconductor devices 110, 120, it is assumed that the identified addresses are the second address #2 and the third address #3, respectively, and the detained operation mode of the low power mode is set to the first mode by the low power mode set module 1025.

If the batteries 200, 220 and the battery 210 are electrically connected, a balancing current $i_2$ is generated due to the energy difference between the batteries 200, 220 and the battery 210. Therefore, the semiconductor device 110 may perform a current control.

In this case, the semiconductor devices 100, 120 enter the low power mode without the debounce operation, but since the semiconductor device 110 executes the current control, the debounce operation is executed for a predetermined time. Further, the semiconductor device 110 enters the low power mode after the debounce operation ends.

Figure 7:
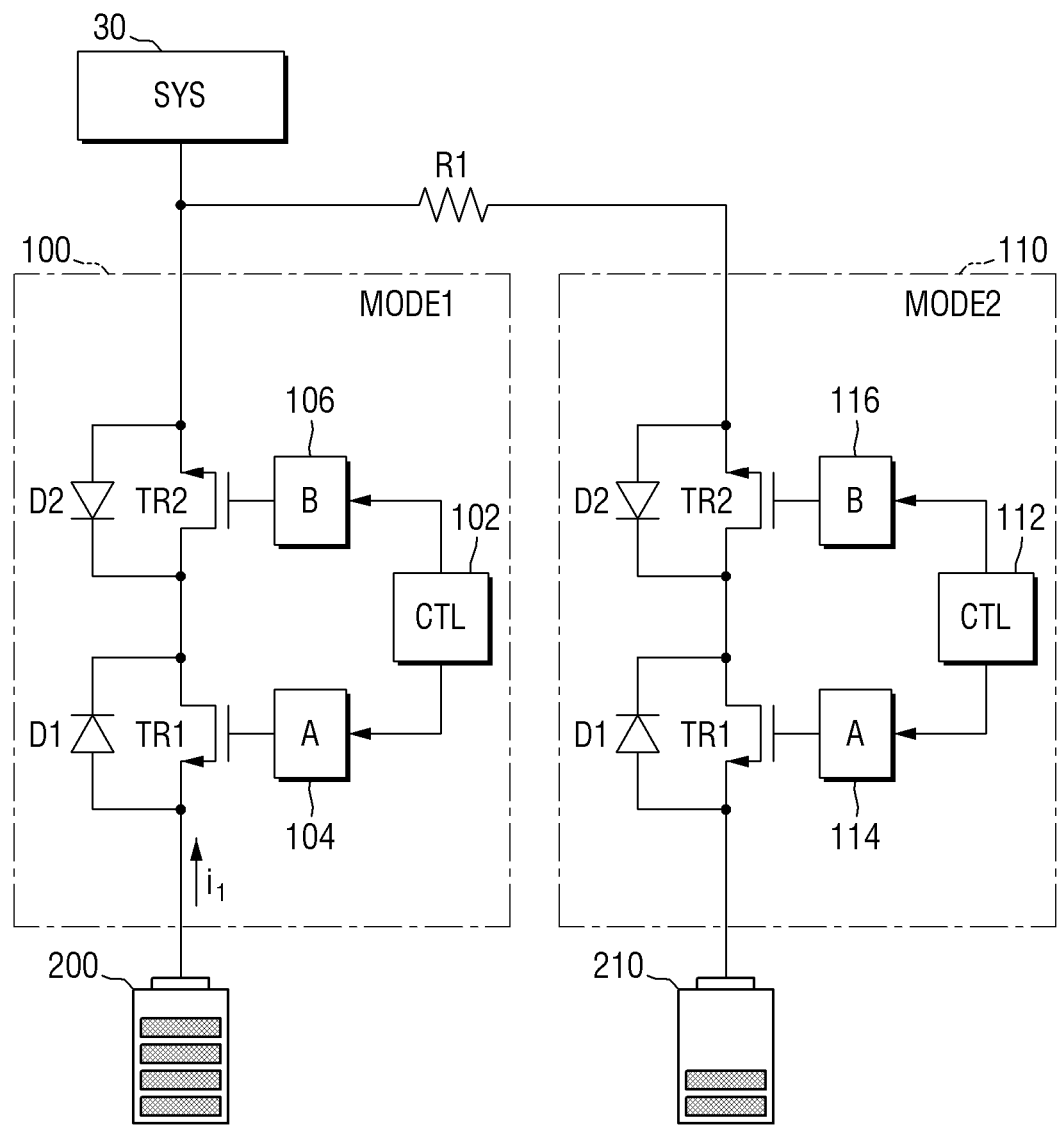
FIG. 7 is a block diagram for explaining the operation example of the semiconductor device according to the example embodiment of the present disclosure.

FIG. 7 is a block diagram for explaining an operation example of the semiconductor device according to the example embodiment of the present disclosure.

Referring to FIG. 7, in the semiconductor system 2 according to an embodiment of the present disclosure, it is assumed that the semiconductor device 100 has the first address #1, the semiconductor device 110 has the second address #2, and the low power enter condition is also satisfied.

Since the identified address is the first address #1, the semiconductor device 100 sets the detailed operation mode of the low power mode to the first mode that maintains the electrical connection between the system 30 and the battery 20.

It is assumed that the identified address is the second address #2, and the detailed operation mode of the low power mode is set to the second mode by the low power mode set module 1025 in the semiconductor device 110.

If the semiconductor device 110 is set to the second mode, since the electrical connection between the system 30 and the battery 210 is in a cut-off state, the semiconductor device 110 does not execute the current control. Therefore, the semiconductor device 110 enters the low power mode without any special operation.

Figure 8:
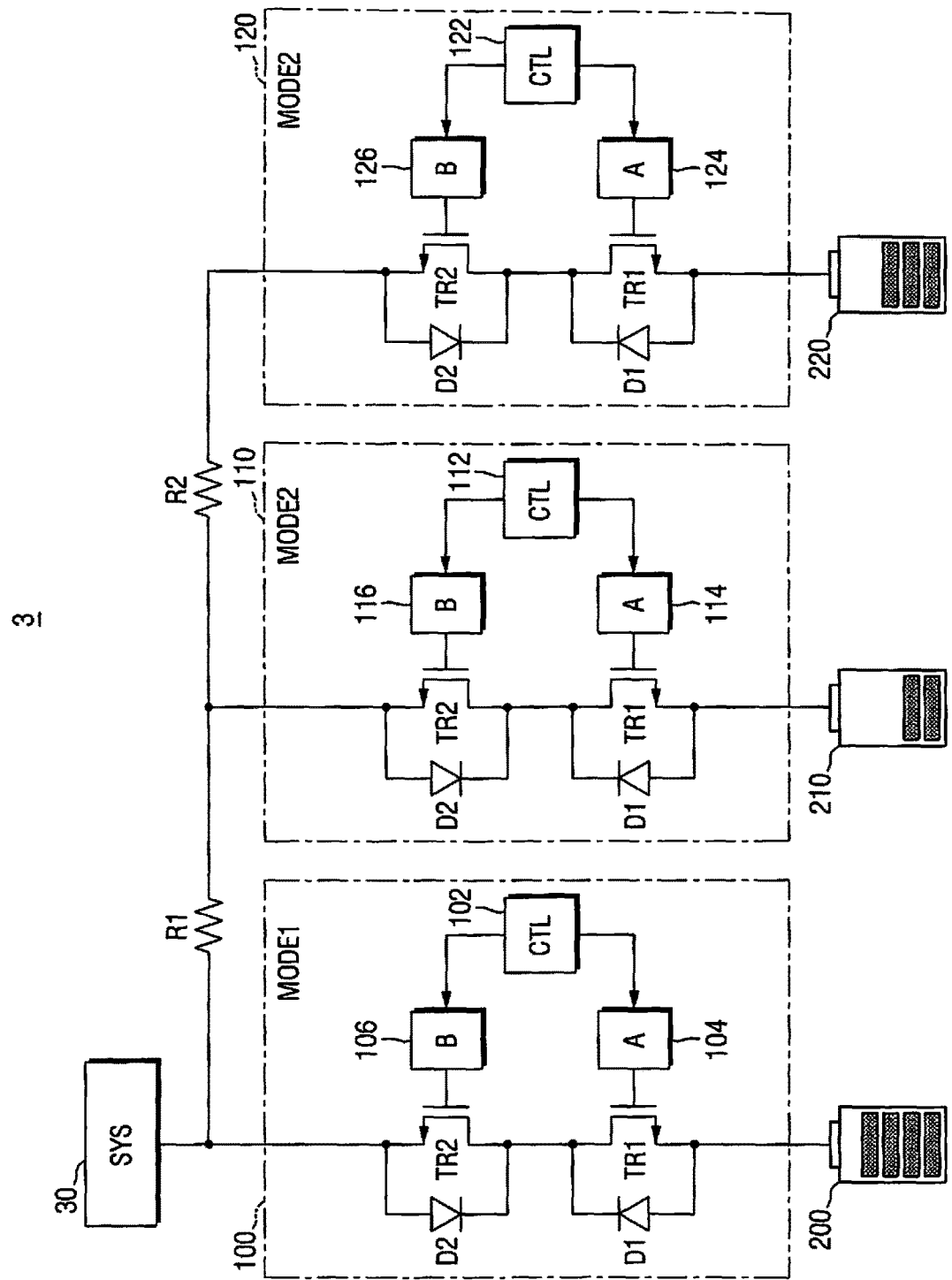
FIG. 8 is a block diagram for explaining the operation example of the semiconductor device according to one example embodiment of the present disclosure.

FIG. 8 is a block diagram for explaining an operation example of the semiconductor device according to an example embodiment of the present disclosure.

Referring to FIG. 8, in the semiconductor system 3 according to an example embodiment of the present disclosure, it is assumed that the semiconductor device 100 has the first address #1, the semiconductor device 110 has the second address #2, the semiconductor device 120 has the third address #3, and the low power enter condition is also satisfied.

Since the identified address is the first address #1, the semiconductor device 100 sets the detailed operation mode of the low power mode to the first mode that maintains the electrical connection between the system 30 and the battery 20.

In the semiconductor devices 110, 120, it is assumed that the identified addresses are the second address #2 and the third address #3, respectively, and the detailed operation mode of the low power mode is set to the second mode by the low power mode set module 1025.

When the semiconductor devices 110, 120 are set to the second mode, since the electrical connection between the system 30 and the battery 210 is in a cut-off state, the semiconductor devices 110, 120 do not execute the current control. Therefore, the semiconductor device 110, 120 enters the low power mode without any special operation.

Figure 9A:
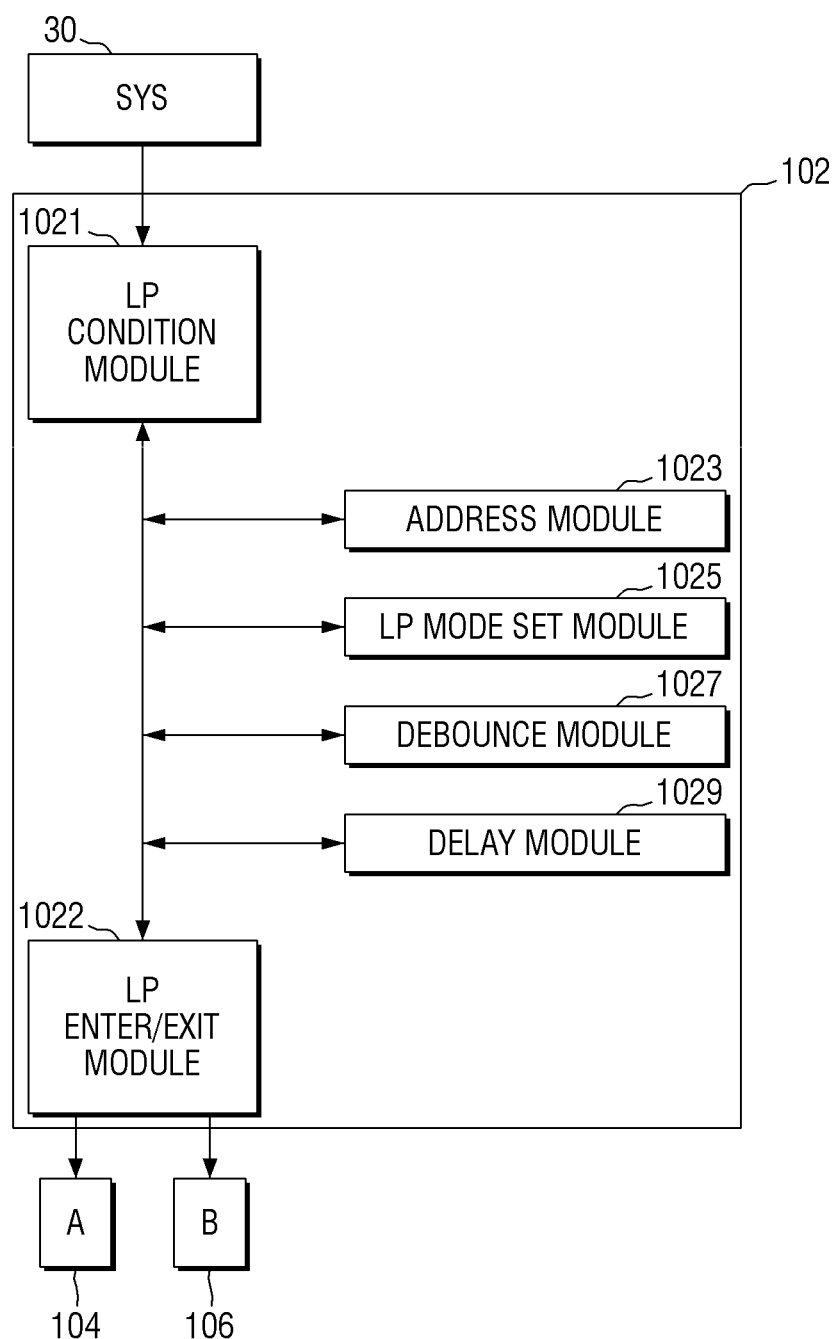
FIG. 9A is a block diagram for explaining a semiconductor device according to an example embodiment of the present disclosure.

FIG. 9A is a block diagram for explaining a semiconductor device according to an example embodiment of the present disclosure.

Referring to FIG. 9A, the controller 102 of the semiconductor device 100 according to an example embodiment of the present disclosure may include a low power condition module 1021, a low power enter/exit module 1022, an address module 1023, a low power mode set module 1025, a debounce module 1027 and a delay module 1029. In the present embodiment, the controller 102 will be described, but the description may be similarly applied to the controllers 112 described in this specification.

In the case of the low power condition module 1021, the low power enter/exit module 1022, the address module 1023, the low power mode set module 1025 and the debounce module 1027, since the contents thereof are explained in FIG. 2B, repeated explanation will not be provided here.

The delay module 1029 executes a delay operation before exiting the low power mode.

Specifically, when the detailed operation mode of the low power mode is the second mode, the delay module 1209 executes a delay operation for a desired (or, alternatively, a predetermined) time. Further, when the delay module 1209 executes the delay operation, the low power enter/exit module 1022 executes an exit from the low power mode after the delay operation ends.

For example, when the address of the semiconductor device 110 is the second address #2 and the detailed operation mode of the low power mode is set to the second mode, the delay module 1029 executes the delay operation having a delay time, for example, for 10 ms. Further, after at least 10 ms has elapsed, the low power enter/exit module 1022 executes the exit from the low power mode after the delay operation ends.

Further, when the address of the semiconductor device 120 is the third address #2 and the detailed operation mode of the low power mode is set to the second mode, the delay module 1029 executes the delay operation having the delay time, for example, for 20 ms. Then, after at least 20 ms has elapsed, the low power enter/exit module 1022 executes the exit from the low power mode after the delay operation ends.

That is, the delay time may be set differently in accordance with the address of the semiconductor device.

Figure 9B:
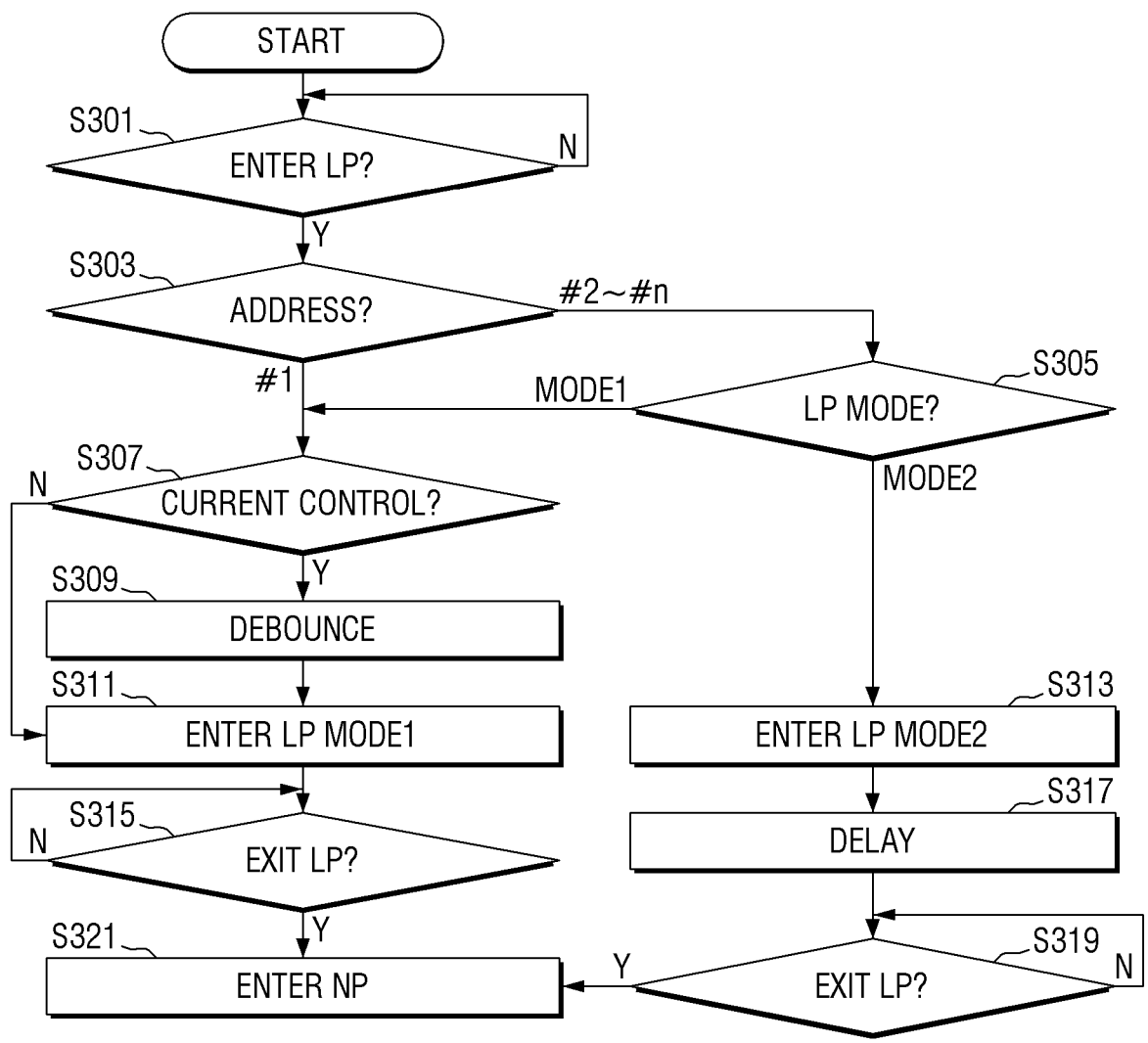
FIG. 9B is a flow chart for explaining a method for operating the semiconductor device according to an example embodiment of the present disclosure.

FIG. 9B is a flow chart for explaining a method for operating a semiconductor device according to an embodiment of the present disclosure.

Referring to FIG. 9B, in the method for operating the semiconductor device according to the embodiment of the present disclosure, since the contents corresponding to S301 to S313 are the same as those described in FIG. 3, the repeated explanation will not be provided.

When the detailed operation mode is set to the first mode and the debounce operation procedure is performed, in operation S315, the controller 102, 112 may determine whether the system 30 operated by the battery 20 satisfies the exit condition of the low power mode.

If the exit condition of the low power mode is satisfied, in operation S321, the semiconductor device exits the low power mode and enters a normal mode.

However, unlike this, when the detailed operation mode is set to the second mode, in operation S317, the controller 102, 112 may execute the delay operation for a desired (or, alternatively, a predetermined) time in association with its own address. Thereafter, after the delay operation ends, the controller 102, 112 may determine whether the system 30 operated by the battery 20 satisfies the exit condition of the low power mode.

If the exit condition of the low power mode is satisfied, in operation S321, the semiconductor device exits the low power mode and enters the normal mode.

Figure 10:
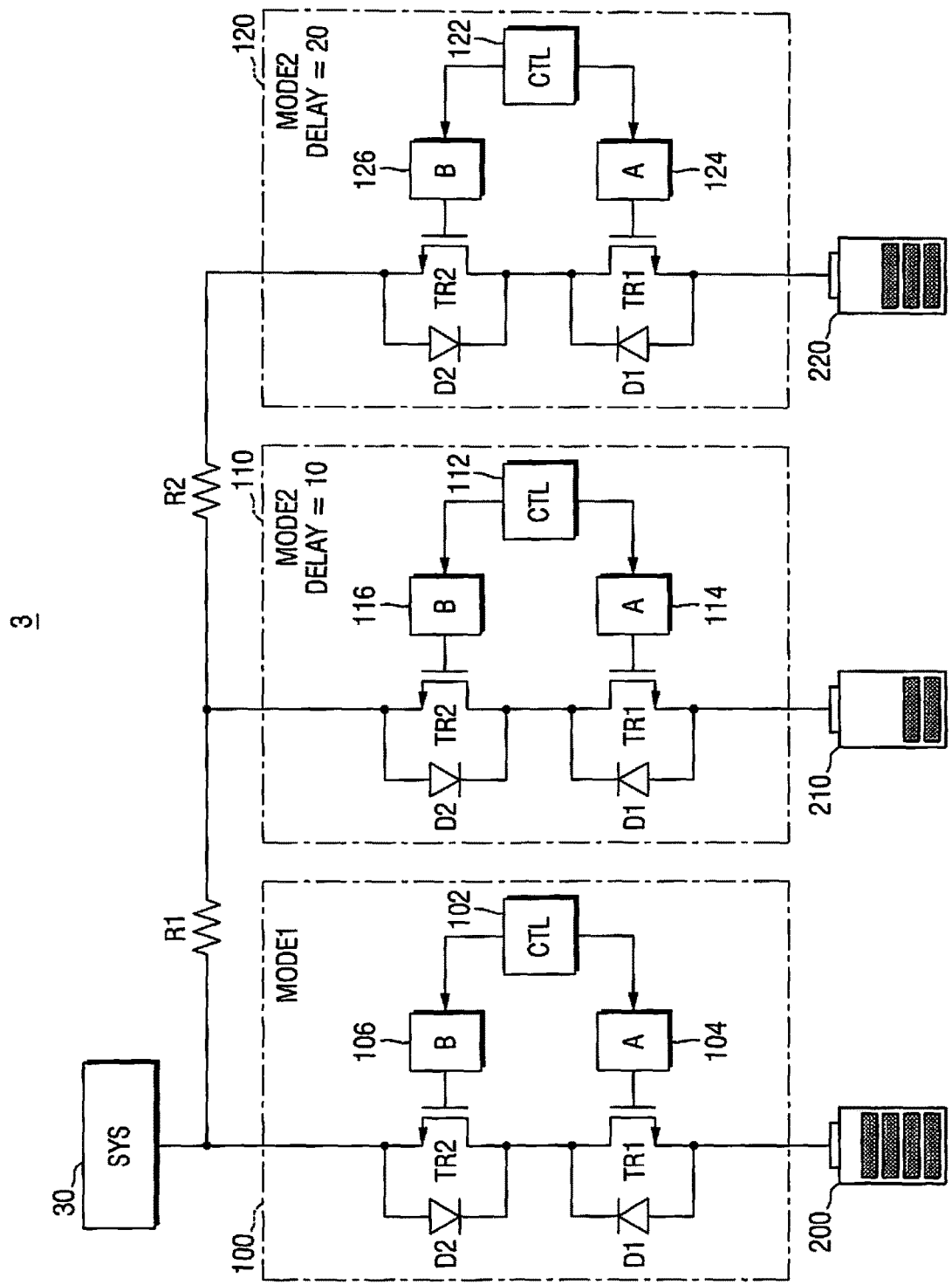
FIG. 10 is a block diagram for explaining an operation example of the semiconductor device according to the example embodiment of the present disclosure.

FIG. 10 is a block diagram for explaining an operation example of the semiconductor device according to the example embodiment of the present disclosure.

Referring to FIG. 10, in the semiconductor system 3 according to an example embodiment of the present disclosure, it is assumed that the semiconductor device 100 has the first address #1, the semiconductor device 110 has the second address #2, the semiconductor device 120 has the third address #3, and the low power exit condition is also satisfied.

Since the identified address is the first address #1, the semiconductor device 100 sets the detailed operation mode of the low power mode to the first mode that maintains the electrical connection between the system 30 and the battery 20. Further, it is assumed that the semiconductor device 100 is in the low power mode.

In the semiconductor devices 110, 120, it is assumed that the identified addresses are the second address #2 and the third address #3, respectively, and the detailed operation mode of the low power mode is set to the second mode by the low power mode set module 1025. Further, it is assumed that the semiconductor devices 110, 120 are also in the low power mode.

The semiconductor device 110 executes a delay operation having a delay time, for example, for 10 ms. Further, after at least 10 ms has elapsed, the low power enter/exit module 1022 executes the exit of the low power mode after the delay operation ends.

Further, the semiconductor device 120 executes a delay operation having a delay time, for example, for 20 ms. Then, after at least 20 ms has elapsed, the low power enter/exit module 1022 executes the exit from the low power mode after the delay operation ends.

According to the various example embodiments of the disclosure described thus far, it is possible to implement the entry and exit of the safe low power mode for systems operated by the multiple batteries. Thus, it is possible to reduce (or, alternatively, prevent) damage to multiple batteries due to an excessive balancing current.

Figure 11:
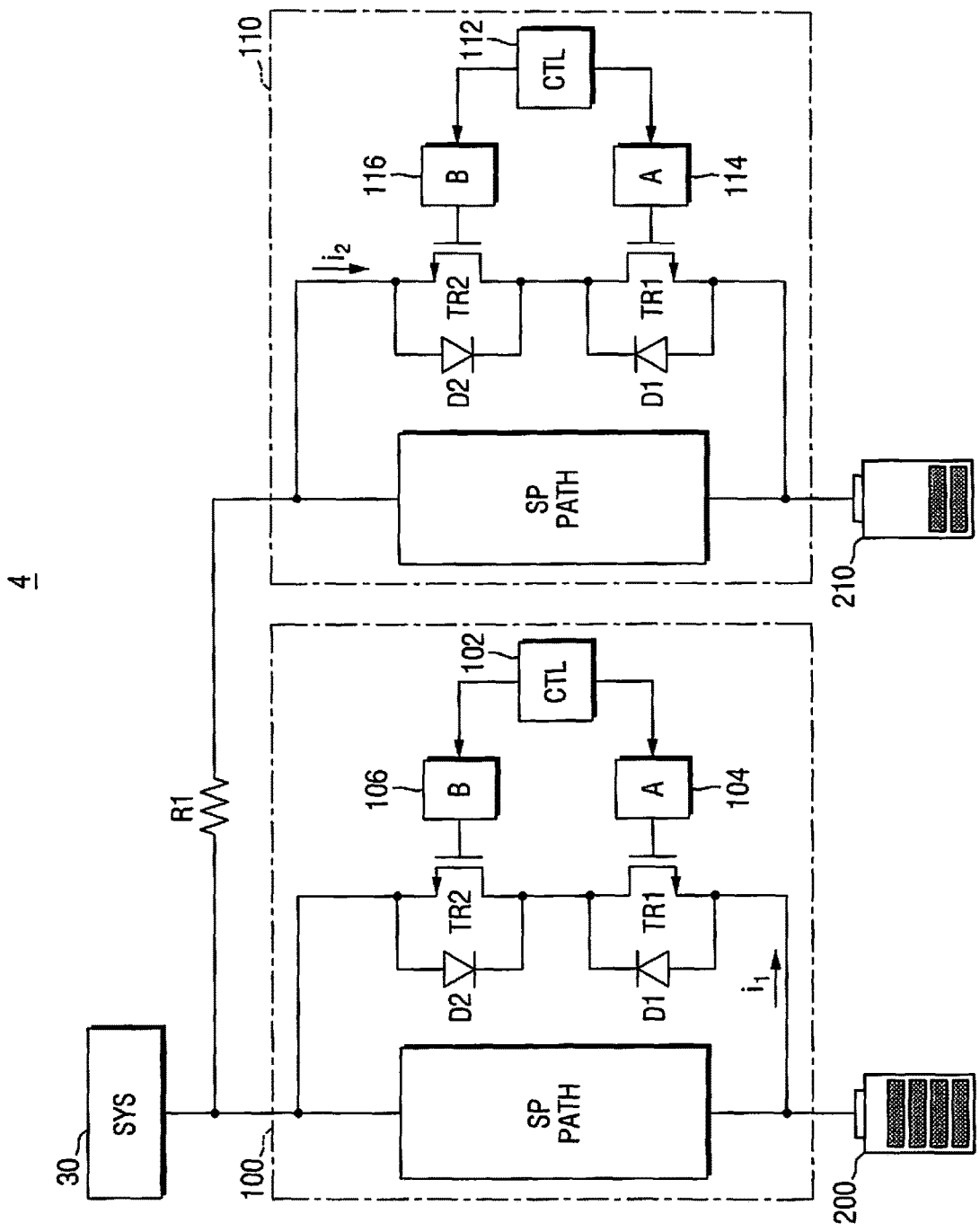
FIG. 11 is a schematic diagram for explaining an implementation example of a semiconductor system according to an example embodiment of the present disclosure.

FIG. 11 is a schematic diagram for explaining an implementation example of the semiconductor system according to an example embodiment of the present disclosure.

Referring to FIG. 11, the semiconductor device 100 further includes an electrical path SP PATH between the system 30 and the battery 200.

The electrical path SP PATH is not used in the case of a general current control operation or the case of low power mode entry and exit, but is used in some special cases. For example, in the case where the battery 200 is not used for a long time and is excessively over-discharged, the battery 200 may be first pre-charged to charge without damage to the battery 200, and in this case, the electrical path SP PATH may be used as a path for pre-charging.

The semiconductor device 110 may also further include the electrical path SP PATH between the system 30 and the battery 200.

Figure 12:
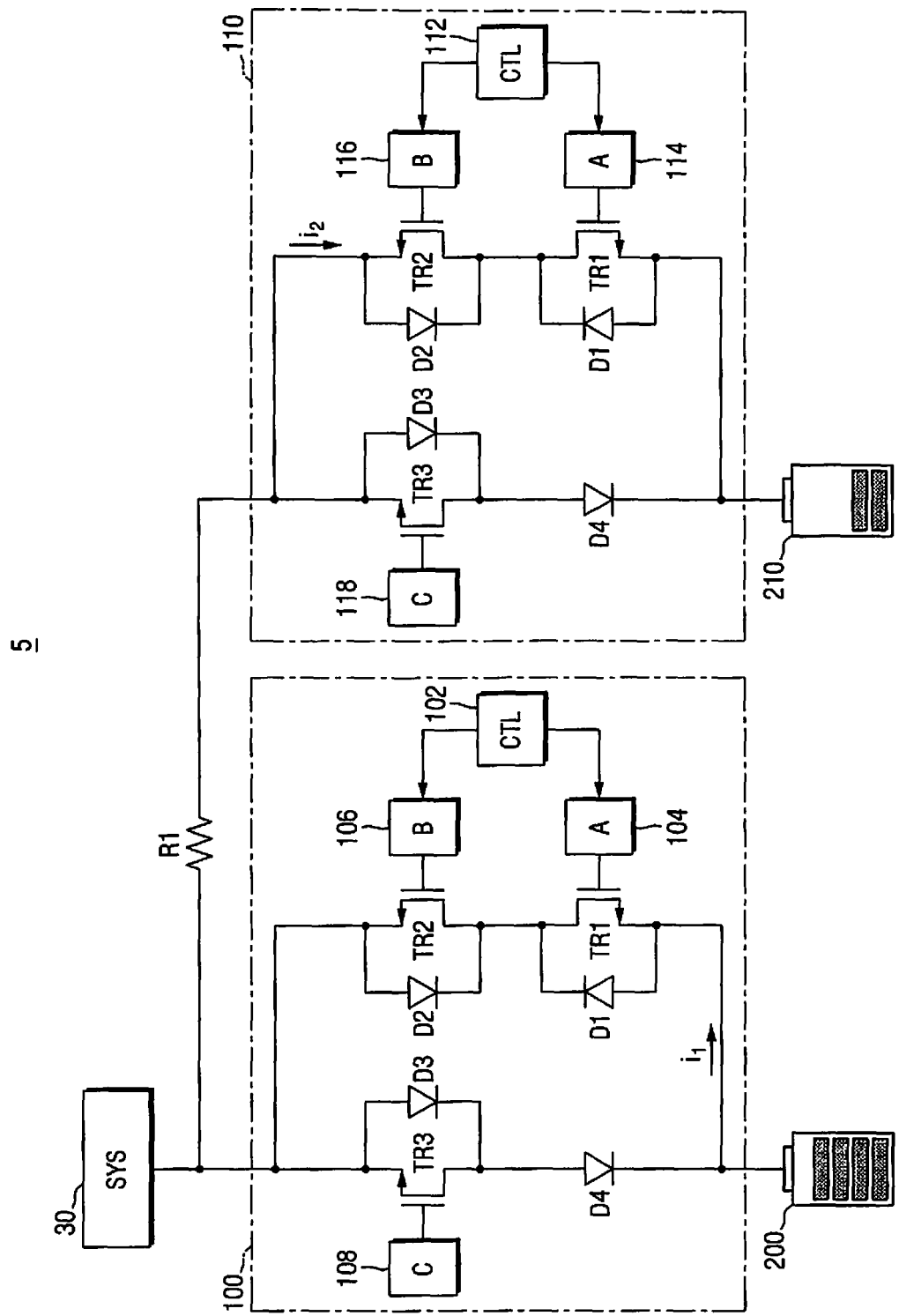
FIG. 12 is a schematic diagram for explaining an implementation example of the semiconductor system according to an example embodiment of the present disclosure.

FIG. 12 is a schematic diagram for explaining the implementation example of the semiconductor system according to an example embodiment of the present disclosure.

Referring to FIG. 12, the semiconductor device 100 further includes an electrical path in which a transistor TR3 is formed between the system 30 and the battery 200.

A diode D3 illustrated in this drawing illustrates a body diode of the transistor TR3. In this example embodiment, the transistor TR3 may be implemented as an n-channel MOSFET, but the scope of the present disclosure is not limited thereto.

The third gate controller 108 may provide a signal for turning on or turning off the transistor TR3 to the gate of the transistor TR3.

The electrical path SP PATH in which the transistor TR3 is formed is not used in the case of a general current control operation or the case of low power mode entry and exit, but is used in some special cases. For example, in the case where the battery 200 is not used for a long time and is excessively over-discharged, the electrical path SP PATH may be used as a path for pre-charging to charge without damage to the battery 200.

The semiconductor device 110 may further include an electrical path in which the transistor TR3 is formed between the system 30 and the battery 200.

In concluding the detailed description, those skilled in the art will appreciate that many variations and modifications may be made to the example embodiments without substantially departing from the principles of the present disclosure. Therefore, the disclosed example embodiments of the disclosure are used in a generic and descriptive sense only and not for purposes of limitation.

What is claimed is:

1. A semiconductor device included in an integrated circuit having a plurality of semiconductor devices associated therewith, the semiconductor device comprising:

processing circuitry configured to,
    determine whether a system operated by batteries satisfies conditions associated with switching operating modes of the semiconductor device, the operating modes including a plurality of low power modes, the plurality of low power modes including a first mode and a second mode,
    identify a relative address associated with the semiconductor device among the plurality of semiconductor devices based on a level of a voltage or current applied to an address ball of the semiconductor device, wherein a battery supplies power to the semiconductor device from among the batteries,
    determine a selected low power operating mode from among the plurality of low power modes in accordance with the relative address associated with the semiconductor device,
    execute a debounce operation to stabilize an output of the battery, and
    switch to the selected low power operating mode after the processing circuitry executes the debounce operation,
    wherein the processing circuitry is configured to,
        set the selected low power operating mode to the first mode, in response to the relative address associated with the semiconductor device being a first address, the first mode being a mode in which the processing circuitry maintains an electrical connection between the system and the battery, and
        set the selected low power operating mode to the first mode or the second mode, in response to the relative address associated with the semiconductor device being a second address, the second mode being a mode in which the processing circuitry cuts off the electrical connection between the system and the battery.

2. The semiconductor device of claim 1, wherein, when the relative address of the semiconductor device is the second address, the processing circuitry is configured to determine the selected low power operating mode as the first mode or the second mode, prior to operation of the semiconductor device.

3. The semiconductor device of claim 1, wherein the processing circuitry is configured to execute the debounce operation for a set time, in response to the processing circuitry detecting a balancing current associated with the semiconductor device and the selected low power operating mode being set to the first mode.

4. The semiconductor device of claim 3, wherein, the processing circuitry is configured to switch to the selected low power operating mode after completion of the debounce operation.

5. The semiconductor device of claim 1, wherein, the processing circuitry is configured to not execute the debounce operation in response to the selected low power operating mode being the second mode.

6. The semiconductor device of claim 1, wherein the processing circuitry is configured to execute a delay operation before exiting the selected low power operating mode such that, when the selected low power operating mode is the second mode, the processing circuitry is configured to execute the delay operation for a set time.

7. The semiconductor device of claim 6, wherein, the processing circuitry is configured to switch from the selected low power operating mode to another one of the operating modes after completion of the delay operation.

8. A semiconductor device included in an integrated circuit having a plurality of semiconductor devices associated therewith, the semiconductor device comprising:
processing circuitry configured to,
    determine whether a system operated by batteries satisfies conditions associated with switching operating modes of the semiconductor device, the operating modes including a plurality of low power modes, the plurality of low power modes including a first mode and a second mode,
    identify a relative address associated with the semiconductor device among the plurality of semiconductor devices based on a level of a voltage or current applied to an address ball of the semiconductor device, wherein a battery supplies power to the semiconductor device from among the batteries,
    determine a selected low power operating mode from among the plurality of low power modes in accordance with the relative address associated with the semiconductor device,
    execute a delay operation, and
    switch to the selected low power operating mode after the processing circuitry executes the delay operation,
    wherein the processing circuitry is configured to,
        set the selected low power operating mode to the first mode, in response to the relative address associated with the semiconductor device being a first address, the first mode being a mode in which the processing circuitry maintains electrical connection between the system and the battery, and
        set the selected low power operating mode to the second mode, in response to the relative address associated with the semiconductor device being a second address, the second mode being a mode in which the processing circuitry cuts off the electrical connection between the system and the battery.

9. The semiconductor device of claim 8, wherein the processing circuitry is configured to execute the delay operation for a set time in response to the selected low power operating mode being the second mode.

10. The semiconductor device of claim 9, wherein, the processing circuitry is configured to switch the system from the selected low power operating mode to another one of the operating modes after completion of the delay operation.

11. A semiconductor device comprising:
a first current control integrated circuit (IC) having a first battery associated therewith; and
a second current control IC having a first second battery associated therewith, the second current control IC being in parallel with the first current control IC between the first and second batteries and a system, the second current control IC configured to operate in various operating modes including a plurality of low power modes, the plurality of low power modes including a first mode and a second mode, the second current control IC configured to,
    identify a relative address associated with the second current IC relative to the first control IC based on a level of a voltage or current applied to an address ball of the semiconductor device,
    determine a selected low power operating mode from among the first mode and the second mode in accordance with the relative address associated with the second control IC,
    execute a debounce operation to stabilize an output of the second battery and switch to the first mode after completion of the debounce operation, in response to determining that the selected low power operating mode is the first mode based on the relative address associated with the second control IC, the first mode being a mode in which the second current control IC maintains an electrical connection between the system and the second battery, and switch to the second mode without executing the debounce operation, in response to determining that the selected low power operating mode is the second mode based on the relative address associated with the second control IC, the second mode being a mode in which the second current control IC cuts off the electrical connection between the system and the second battery.

12. The semiconductor device of claim 11, wherein the second current control IC is configured to execute the debounce operation for a set time before entering the first mode, in response to the second current control IC detecting a balancing current associated with the second current control IC while the second current control IC is set to switch to the first mode.

13. The semiconductor device of claim 11, wherein, the second current control IC is configured to execute a delay operation for a set time before exiting a selected one of the plurality of low power modes such that, when the selected one of the plurality of low power modes is the second mode, the second current control IC is configured to execute the delay operation for a set time.

14. The semiconductor device of claim 13, wherein the second current control IC is configured to switch from the selected one of the plurality of low power modes to a different one of the operating modes after completion of the delay operation.

* * * * *